(12) United States Patent
Ariga

(10) Patent No.: US 7,505,079 B2
(45) Date of Patent: Mar. 17, 2009

(54) IMAGE PICKUP APPARATUS HAVING AUDIO OUTPUT UNIT

(75) Inventor: Kazuto Ariga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 554 days.

(21) Appl. No.: 11/098,382

(22) Filed: Apr. 5, 2005

(65) Prior Publication Data

US 2005/0248683 A1    Nov. 10, 2005

(30) Foreign Application Priority Data

Apr. 23, 2004    (JP)    .............................. 2004-127991

(51) Int. Cl.
   *H04N 5/225*    (2006.01)
(52) U.S. Cl. .................................................. 348/374
(58) Field of Classification Search ................ 348/373, 348/374, 371, 375; 396/177, 178, 176; 381/334, 381/336, 335, 386; 181/149
   See application file for complete search history.

(56) References Cited

U.S. PATENT DOCUMENTS 5,070,348 A * 12/1991 Hayakawa et al. ............ 396/26
5,111,222 A * 5/1992 Hayakawa et al. ............ 396/26
6,128,394 A * 10/2000 Hayakawa et al. .......... 381/386
2004/0117729 A1   6/2004 Ariga ....................... 715/500.1
2004/0201775 A1* 10/2004 Brake et al. ................. 348/375
2004/0212727 A1  10/2004 Ariga ......................... 348/375
2005/0012852 A1*  1/2005 Gann et al. ................. 348/373
2005/0179813 A1*  8/2005 Fujii et al. .................. 348/375
2005/0220448 A1* 10/2005 Tei et al. ...................... 396/25

FOREIGN PATENT DOCUMENTS

JP    2003-57730    2/2003

* cited by examiner

*Primary Examiner*—Ngoc-Yen T Vu
*Assistant Examiner*—Gary C Vieaux
(74) *Attorney, Agent, or Firm*—Fitzpatrick, Cella, Harper & Scinto

(57) ABSTRACT

An image pickup apparatus. such as a digital camera, includes comprises a barrel, an optical viewfinder, an audio output unit, such as a speaker, and a light emitting unit, such as a strobe light. The barrel includes an image pickup element and a lens. The audio output unit is arranged in a space surrounded by the barrel, the optical viewfinder, and the light emitting unit.

1 Claim, 3 Drawing Sheets

7,505,079 B2

IMAGE PICKUP APPARATUS HAVING AUDIO OUTPUT UNIT

BACKGROUND OF THE INVENTION

1. Field of the Invention

The invention relates to an image pickup apparatus having an audio output unit.

2. Related Background Art

Hitherto, there is a digital camera having a speaker arranged above a stroboscopic unit (for example, refer to Japanese Patent Application Laid-Open No. 2003-57730).

The speaker is arranged so that an-opening surface thereof is parallel with an upper surface of the camera and an audio sound, a warning sound, or a focus sound is generated from a louver (vent hole) formed in the upper surface of the camera.

However, since the speaker is arranged above the stroboscopic unit, a height of camera is large. Further, since the louver is formed in the upper surface of the camera, waterdrop such as rain or the like directly enters an opening portion of the speaker, causing an inconvenience such as deterioration of sound quality or the like due to the defective operation of diaphragm paper.

Although there is a digital camera in which a water-repellent sheet is added between the louver and the opening portion in order to prevent such an inconvenience, the costs are increased in correspondence to the sheet.

Since the speaker opening portion and the camera louver are too close to each other, a camera cover is vibrated by a sound pressure from a speaker and what is called a chattering sound is generated, thereby deteriorating the sound quality.

Since the louver is located near the edge portion of the upper surface of the digital camera, there is also such an inconvenience that the louver is covered by the operator's hand in dependence his holding state and he cannot sufficiently hear the sound from the speaker.

SUMMARY OF THE INVENTION

It is an object of the invention to accomplish miniaturization without increasing a height of image pickup apparatus.

To accomplish this object, according to an embodiment of the invention, an image pickup apparatus of the present invention comprises: a barrel including an image pickup element and a lens; an optical viewfinder; an audio output unit for generating a sound; and a light emitting unit having a member for emitting light, wherein the audio output unit is arranged in a space surrounded by the barrel, the optical viewfinder, and the light emitting unit.

The above and other objects and features of the present invention will become apparent from the following detailed description and the appended claims with reference to the accompanying drawings.

DETAILED DESCRIPTION OF THE PREFERRED EMBODIMENT

Figure 1:
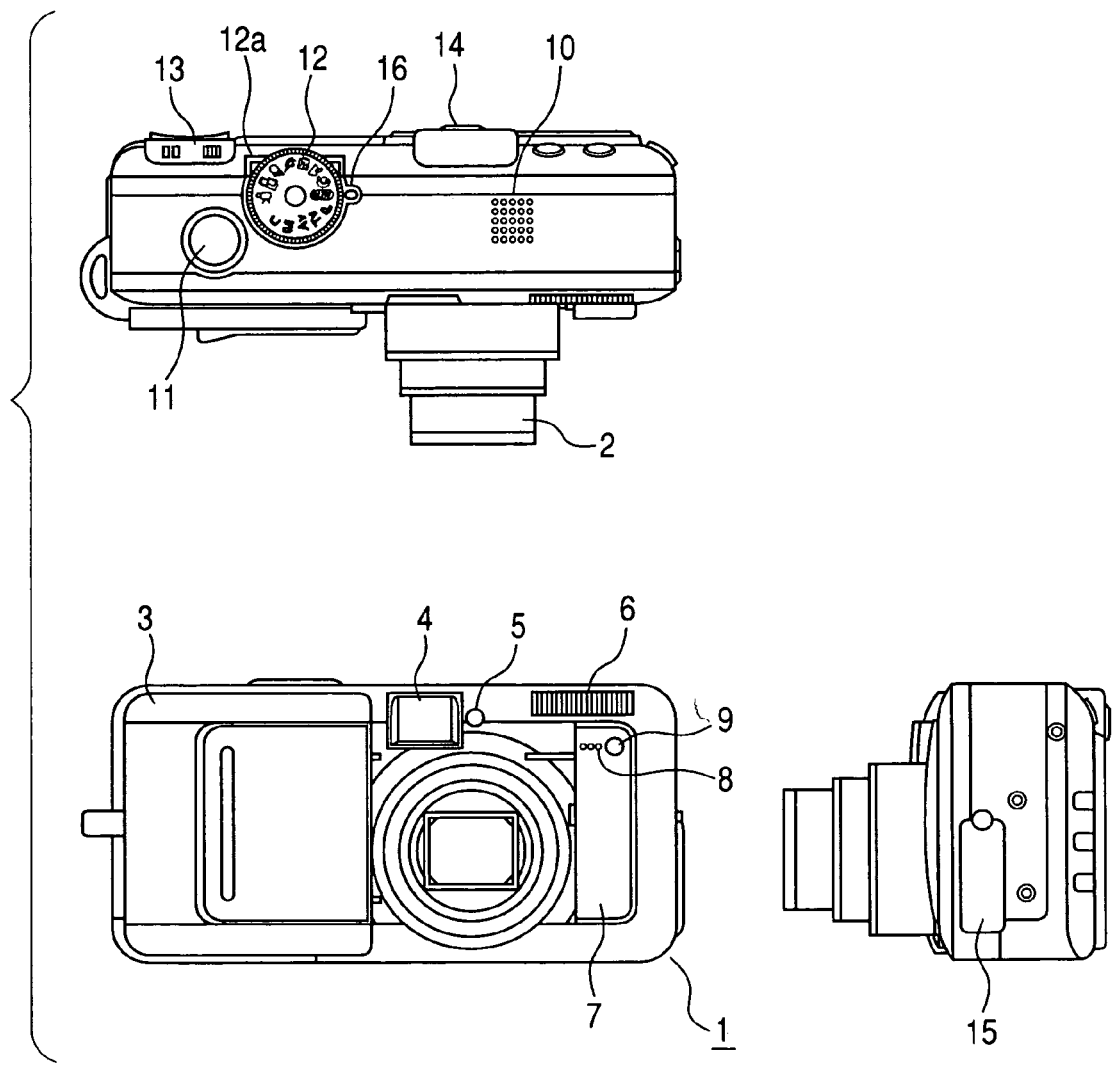
FIG. 1 shows a front view, a plan view, and a side elevational view of a digital camera.

In FIG. 1, reference numeral 1 denotes a digital camera main body; 2 denotes a lens barrel containing a solid state image pickup element; 3 denotes a lens barrier which is closably attached to the digital camera main body 1 by a mechanism (not shown) in order to protect the lens barrel 2 which is enclosed in the non-photographing mode; 4 denotes an optical viewfinder; 5 denotes an autofocus (AF) auxiliary light window for passing AF auxiliary light which is automatically projected when the digital camera determines that a photographing ambient environment is dark, thereby assisting the autofocus (AF) operation; 6 denotes a prism panel serving as a stroboscopic unit light emitting unit; 7 denotes a barrier stopper serving as a closing position restricting member of the lens barrier 3; 8 denotes a microphone hole formed in the barrier stopper 7; 9 denotes a remote control receiving window which is provided for the barrier stopper 7 and receives a signal from a remote control transmitter; 10 denotes a louver formed in the upper surface of the digital camera main body 1 in order to output an audio sound, a warning sound, or a focus sound from a speaker, which will be explained in detail hereinafter; 11 denotes a shutter button; 12 denotes a mode dial for switching a photographing mode; 13 denotes a zoom button for switching a photographing angle of view to TELE or WIDE; 14 denotes an eyepiece ring arranged on an eyepiece side of the optical viewfinder 4; and 15 denotes a jack cover made of an elastic member to protect an AV jack (for outputting an audio sound and a video signal) and a USB jack (for communicating with a personal computer (PC) or the like) provided for the digital camera main body 1 against dusts or the like.

FIG. 1 is a diagram showing a photographing state where the lens barrier 3 is opened and the lens barrel 2 is fed out. The operator decides a desired composition of an object by using the zoom button 13 and depresses the shutter button 11 up to a first release position. When an in-focus state is obtained, a focus sound is generated through the louver 10. By further depressing the shutter button 11 up to a second release position, a shutter sound is generated through the louver 10 and the photographing is completed. To photograph a motion image, the operator rotates the mode dial 12 and sets a motion image mode icon 12a to an index 16. Subsequently, he determines a desired composition of the object by using the zoom button 13 and depresses the shutter button 11 up to the first release position. When the in-focus state is obtained, the focus sound is generated through the louver 10. By further depressing the shutter button 11 up to the second release position, a sound indicative of the start of the motion image photographing is generated, the motion image photographing is started, and the audio sound is also simultaneously recorded through the microphone hole 8. By depressing the shutter button 11 again, the photographing is finished. To see the photographed motion image, by depressing a mode change-over button (not shown) provided on the rear surface of the camera, an operating mode is switched to a reproducing mode. The operator selects a desired motion image with a four-way operational button (not shown) and depresses a decision button (not shown), so that the reproduction of the motion image is started. At this time, the photographed motion image is reproduced and displayed on a liquid crystal display screen (not shown) and the recorded audio sound is also reproduced through the louver 10.

Figure 2:
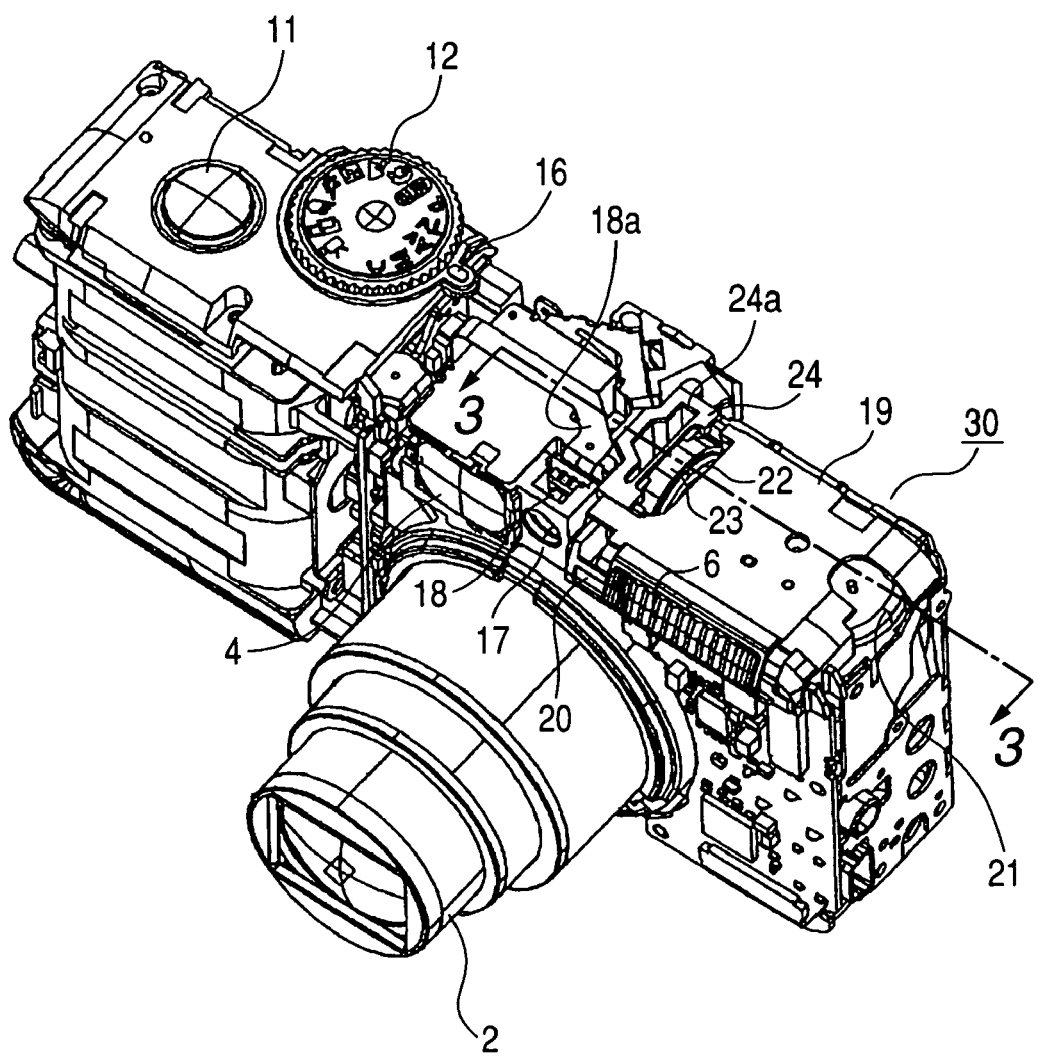
FIG. 2 is a schematic perspective view of the digital camera.
Figure 3:
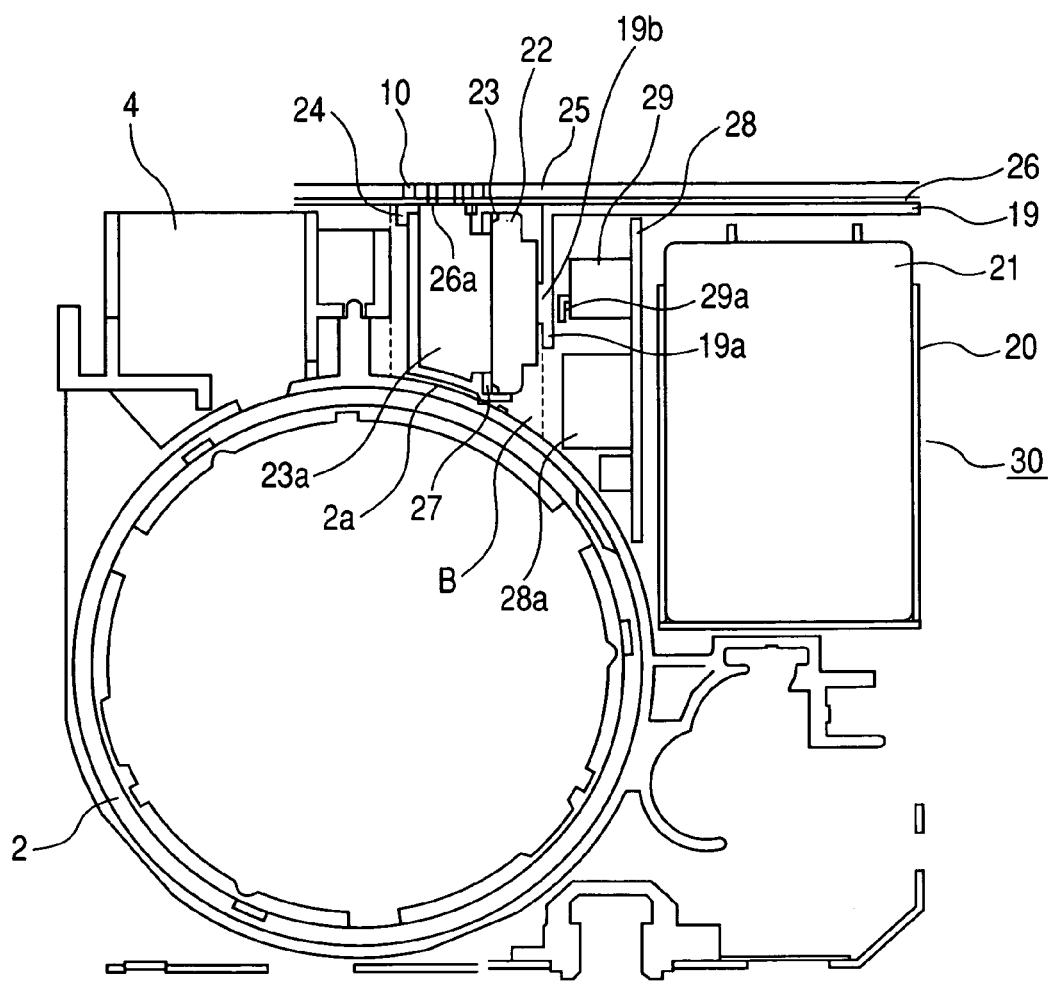
FIG. 3 is a schematic cross sectional view of the digital camera taken along the line 3-3 in FIG. 2.

FIG. 2 is a schematic perspective view showing the state where a whole metal cover of the digital camera main body is removed. Reference numeral 17 denotes an auxiliary light holding unit provided for the optical viewfinder 4; 18 denotes an AF-LED soldered to a flexible wiring plate 18a; 19 denotes an ST cover serving as an upper cover of a stroboscopic unit 30; 20 denotes an ST base serving as a lower cover of the stroboscopic unit 30; 21 denotes a main capacitor; 22 denotes a speaker for generating a sound; 23 denotes a speaker holding unit; and 24 denotes a speaker bush for assuring sealing of an upper metal cover (not shown) and the speaker holding unit 23. The stroboscopic unit 30 is constructed by: the prism panel 6; a light emitting unit having therein an Xe lamp and a rubber bush (both are not shown); the ST cover 19; the ST base 20; the main capacitor 21; and a stroboscopic circuit board (not shown). As shown in FIG. 2, the speaker 22 is arranged in a space formed by the auxiliary light holding unit 17, optical viewfinder 4, stroboscopic unit 30, and lens barrel 2 so that an opening surface of the speaker 22 is almost parallel with a plane which is defined by an optical axial direction of the lens barrel 2 and a Y-axial direction of the lens barrel 2 (direction which is perpendicular to the optical axis and, further, perpendicular to the bottom surface of the digital camera), in other words, the speaker 22 is vertically arranged. FIG. 3 showing a cross sectional view taken along the line 3-3 in FIG. 2 is used to explain the above construction in detail.

In FIG. 3, reference numeral 25 denotes a TOP cover serving as an upper metal cover of the digital camera main body; 26 denotes an SUS plate fixed to the TOP cover with a very thin double-adhesive tape (not shown); 27 denotes a speaker ring made of an elastic member; 28 denotes a stroboscopic circuit board fixed onto the ST base with screws (not shown); and 29 denotes a trigger coil attached to the stroboscopic circuit board 28. As mentioned above, the speaker 22 is vertically arranged in the space formed by the optical viewfinder 4, stroboscopic unit 30, and lens barrel 2, that is, in a space B surrounded by a broken line. In the space B, corner portions which has an almost triangle shape are formed by an R surface 2a of the lens barrel 2. Hitherto, the space B could be nothing but a dead space. For example, if the speaker 22 is laterally arranged in parallel with the TOP cover 25, first, since an interval between the optical viewfinder 4 and the stroboscopic unit 30 is too narrow, a size of digital camera main body in the lateral direction cannot help being increased. On the other hand, the dead space which is formed in the rear side of the speaker (the surface opposite to the opening portion) further increases. In the embodiment, however, the speaker 22 is vertically arranged and the opening surface of the speaker 22 is positioned on the main capacitor 21 side with respect to the Y axis of the lens barrel 2. If the opening surface is positioned on the Y axis, the height of digital camera main body is higher than the lateral size. However, by deviating the speaker from the Y axis, the position of the speaker drops along the R surface of the lens barrel and a height of rear portion can be lowered. The space can be fairly effectively used as compared with the conventional case where nothing can be arranged in the R surface portion as mentioned above and the dead space occurs.

In the embodiment, the speaker 22 is fixed to the speaker holding unit 23 by the speaker ring 27 made of a ring-shaped elastic member having adhesive portions on both sides. The speaker bush 24 for sealing is sandwiched between the speaker holding unit 23 and the SUS plate 26. A space 23a of the speaker holding unit 23 is a sealed space whose periphery other than an upper portion is covered with a wall. The sound generated through the opening portion of the speaker 22 passes through a hole 26a formed in the SUS plate 26 without a sound leakage owing to a packing effect of the speaker ring 27 and the speaker bush 24 and is propagated to the outside from the louver 10 formed in the TOP cover 25. As for sound quality of the speaker, it is important how to propagate a sound from a sound source to the louver as a final opening portion without a leakage. In this sense, as a louver 10 formed in the TOP cover 25, many louvers are opened from a viewpoint of a design. However, the hole 26a in the SUS plate 26 exists only on the opening portion (24a in FIG. 2) formed in the speaker bush 24 and is formed in the position corresponding to the louver of the design lest the sound leaks. Further, the rear surface of the speaker 22 is pressed by a convex portion 19b provided for a rib 19a of the ST cover 19. By applying a force to the speaker 22 in the direction in which the speaker ring 27 is crushed, not only the fixing by the foregoing adhesive material but also certain sealing of the same level as the sandwiching of the speaker bush 24 is obtained. A space 23a provided for the front surface of the opening portion of the speaker 22 is validated as an echo space owing to such a sealing state. Speaker sound quality, particularly, a low frequency range is improved. Hitherto, Since the speaker opening portion and the camera louver are too close to each other, the camera cover is vibrated by the sound pressure from the speaker and what is called a chattering sound is generated, thereby deteriorating the sound quality. However, such a point is also improved. Hitherto, since the speaker opening portion faces the camera louver, the waterdrop such as rain or the like directly enters the speaker opening portion, the water-repellent sheet is further necessary to prevent it. However, in the embodiment, since the space 23a merely exists just under the louver 10, the water-repellent sheet which causes an increase in costs is unnecessary.

In the embodiment, since the speaker 22 is arranged between the optical viewfinder 4 and the stroboscopic unit 30, the louver 10 corresponding to this speaker is located at almost the center of the upper surface of the digital camera main body. Thus, when the operator grasps the digital camera, a possibility that the louver 10 is covered with the hand is fairly small. In other words, hitherto, there is a case where if the louver exists at the end, the louver is covered with the operator's hand depending on his holding state, so that there is such an inconvenience that it is difficult for him to hear the sound. However, according to the invention, there is obtained the digital camera in which the operator does not need to be aware of the holding state where the louver is not covered with his hand and, even if he freely grasps the camera, he can listen to the satisfactory sound.

A trigger output pin 29a is provided for a trigger coil 29 on the stroboscopic circuit board 28. A voltage of about 4 kV is generated at the time of the stroboscopic light emission. Since insulation performance of the air is ordinarily equal to 1 mm at 1 kV, there is such a serious inconvenience that if conductive parts are arranged in a position within 4 mm around the trigger output pin 29a, a trigger leakage occurs and the stroboscopic light emission is not performed. In the embodiment, a metal casing on the rear side of the speaker 22 and the trigger coil 29 correspond to those parts. However, miniaturization of recent digital cameras is always demanded and an insulating space cannot be easily formed around the trigger output pin 29a. Therefore, hitherto, the whole trigger coil is generally covered with a trigger cap made of a resin material such as polypropylene or the like, thereby assuring the necessary insulation performance and arranging the parts around the trigger coil. However, since the whole trigger coil is covered with the trigger cap, a layout of other electric circuit parts on the stroboscopic circuit board 28 is restricted, it is necessary to enlarge an outer shape of the circuit board, and further, the costs are increased by an amount of the trigger cap. In the embodiment, therefore, the rib 19a is projected from the ST cover 19 so as to cover the rear side of he speaker 22. By forming the enough large rib, a creepage distance necessary for insulation can be assured and there is no need to prepare the trigger cap. As mentioned above, the rib 19a also contributes to seal the speaker 22. Such two improvement effects that the trigger coil can be insulated and the speaker having the high sound quality are obtained without enlarging the camera can be derived.

Many widely different embodiments of the present invention may be constructed without departing from the scope of the present invention. It should be understood that the present invention is not limited to the specific embodiments described in the specification, except as defined in the appended claims.

This application claims priority from Japanese Patent Application No. 2004-127991 filed Apr. 23,2004, which is hereby incorporated by reference herein.

What is claimed is:

1. An image pickup apparatus comprising:
a barrel including an image pickup element and a lens;
an optical viewfinder;
an audio output unit that generates a sound;
an external housing member which includes a hole formed therethrough, said hole being formed in a surface of said external housing member perpendicular to the sound output plane of said audio output unit;
a holding member which holds said audio output unit so that there is space in front of said sound output plane of said audio output unit and said holding member seals off surfaces surrounding the space other than that facing the hole; and
a light emitting unit having a member that emits light,
wherein said audio output unit is vertically arranged in a space surrounded by said barrel, said optical viewfinder and said light emitting unit in such a manner that a sound output plane of said audio output unit is almost parallel with each of opposite surfaces of said optical viewfinder and said light emitting unit, and
wherein said light emitting unit includes a pressing unit which presses said audio output unit toward said holding member.

* * * * *